(12) United States Patent
Ota (10) Patent No.: US 8,201,202 B2
(45) Date of Patent: Jun. 12, 2012

(54) HIGH QUALITY VIDEO DELIVERY VIA THE INTERNET

(75) Inventor: Takaaki Ota, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 891 days.

(21) Appl. No.: 11/643,478

(22) Filed: Dec. 21, 2006

(65) Prior Publication Data

US 2008/0155623 A1 Jun. 26, 2008

(51) Int. Cl.
G06F 3/00 (2006.01)
(52) U.S. Cl. .......................... 725/46; 725/49
(58) Field of Classification Search .............. 725/46, 725/49
See application file for complete search history.

(56) References Cited

U.S. PATENT DOCUMENTS

| | | | |
|---|---|---|---|
| 5,914,712 A | 6/1999 | Sartain et al. | |
| 6,269,394 B1 | 7/2001 | Kenner et al. | |
| 6,577,311 B1 * | 6/2003 | Crosby et al. | 345/428 |
| 6,925,651 B2 | 8/2005 | Foster et al. | |
| 6,944,585 B1 * | 9/2005 | Pawson | 703/22 |
| 6,978,306 B2 | 12/2005 | Miller et al. | |
| 7,028,096 B1 * | 4/2006 | Lee | 709/231 |
| 2002/0073214 A1 * | 6/2002 | Iinuma | 709/229 |
| 2002/0116473 A1 * | 8/2002 | Gemmell | 709/219 |
| 2002/0170063 A1 * | 11/2002 | Ansari et al. | 725/95 |
| 2005/0081251 A1 | 4/2005 | Walker et al. | |
| 2005/0149965 A1 * | 7/2005 | Neogi | 725/14 |
| 2005/0235330 A1 * | 10/2005 | O'Donnell et al. | 725/87 |
| 2008/0148317 A1 * | 6/2008 | Opaluch | 725/46 |

FOREIGN PATENT DOCUMENTS

WO WO 00/31964 6/2000

* cited by examiner

Primary Examiner — Joseph P Hirl
Assistant Examiner — Hyun Hong
(74) Attorney, Agent, or Firm — Miller Patent Services; Jerry A. Miller

(57) ABSTRACT

A method of providing improved quality of Internet Protocol (IP) video content over the Internet involves, for an item of content, calculating a score representative of a likelihood that a particular viewer will order the item of content; if the score is greater than a threshold score T, then downloading a portion of the item of content from a content provider, and storing the portion of the item of content in a storage location local to the viewer; if the viewer elects to view the item of video content, then: retrieving the stored portion of the item of video content, streaming an augmentation to the stored portion of the item of video content from the content provider, and combining the stored portion with the augmentation of the stored portion to produce an improved resolution version of the item of video content. This process can be carried out in an IPTV adapter. This abstract is not to be considered limiting, since other embodiments may deviate from the features described in this abstract.

33 Claims, 4 Drawing Sheets

HIGH QUALITY VIDEO DELIVERY VIA THE INTERNET

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Despite advancements in audio and video signal compression technology, Internet based distribution of high quality and high definition content is still not practical. Attempts to resolve this dilemma have largely focused on attempts to come up with higher efficiency in compression than today's most advanced compression technology such as AVC or VC1. However, availability of improved compression that can fully solve this problem is not expected within the foreseeable future. Moreover, solutions such as providing a thick dedicated data pipe having very wide bandwidth to each home is too costly to be practical in most instances. Since compression technology alone doesn't provide stable and affordable HD audio video (A/V) distribution over the Internet, true on-demand high definition and high quality A/V over the Internet is currently not available.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

For purposes of this document, the term "local" is intended to mean in close proximity to the user's IPTV equipment, network or display device. For example, any location that would normally be considered to be the Customer Premise (CP) would be considered local.

In accordance with embodiments consistent with the present invention, it is desired to deliver high quality audio and/or video to a customer on demand via the Internet. In this scenario, if one places 100% reliance on real-time on-demand service there will often be a need to compromise the quality due to insufficient data bandwidth, or else pay a very high premium to guarantee a thick data pipe having adequate bandwidth. Similarly, if one 100% relies on local storage with non-real time pre-delivery mechanism one cannot provide the ability to serve on-demand impulse requests for content that is not pre-stored. In accord with embodiments consistent with the present invention, however, by combining a real-time data path, which may not be wide enough to deliver full quality content, and a local storage system such as hard disk drive that contains pre-delivered data, enhanced service can be provided.

Hence, in accord with certain embodiments consistent with the present invention, A/V content can be pre-delivered based on statistical information such as viewer's historical inclination/preference and general popularity of the content. Decisions as to what content to pre-fetch can be made based upon fuzzy logic, neural network or artificial intelligence like processing using various inputs to help determine which content has a high likelihood of consumption. But, under this scenario, the content is not complete and does not have the quality required. This data may be, for example, a compressed A/V signal of a lower quality than that desired for presentation of the content. What lower quality can mean that the content maybe lower resolution in space (scaled down picture) or frame dropped (15 fps instead of 30 fps). This lower quality content may contain an essence of the original content but is not the whole of it. This lower quality content is usable but not preferable. For example, the lower quality content can be standard definition or lower rather than high definition quality.

When a viewer requests the content, the system looks into the local storage to see if the requested content (in a lower quality version) exists. If it does exist, the system requests the server to start streaming augmentation or enhancement data. Such augmentation data may be high frequency components of the original signal or frames that were sub sampled. When this real-time on-demand augmentation data is combined with the lower quality data already stored in the local storage the system, a full high quality rendition of the original content can be produced.

In the case where the data pipe's available bandwidth fluctuates and thus, is unable to deliver continuous augmentation data the system can still deliver sub quality version of the content in order to maintain uninterrupted presentation of the content. The result is some fluctuation in quality but not interruption of the program.

When a viewer requests content and the requested content is not found in the local storage, the system requests a server to start streaming a lower quality version of the content whose bandwidth is low enough to survive through the narrow Internet pipe. The quality is compromised throughout the program but the request is fulfilled. The basic idea is applicable in any data delivery system in which variable quality data such as audio and video can be considered acceptable.

Figure 1:
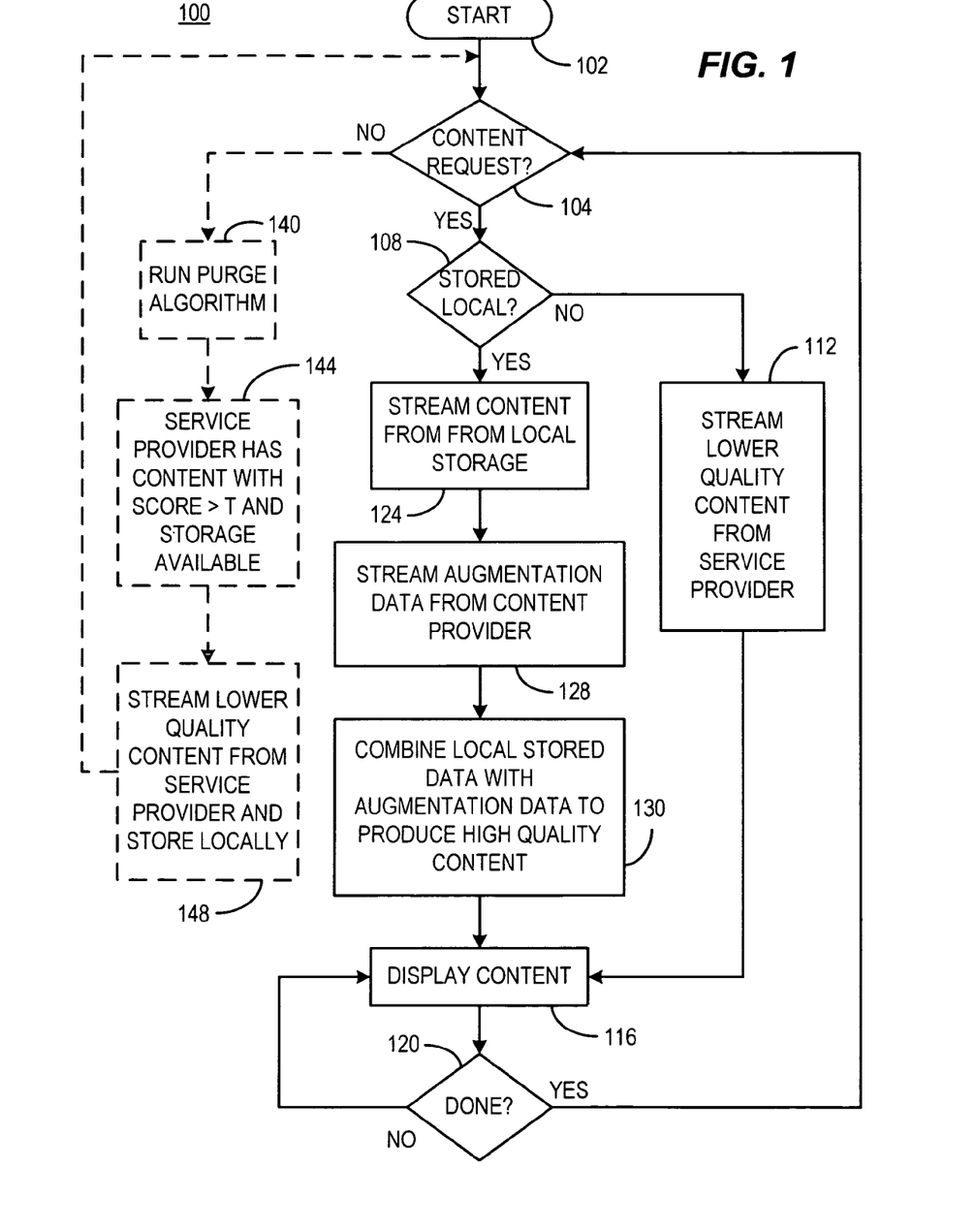
FIG. 1 is a flow chart of an overall process consistent with certain embodiments of the present invention.

Referring now to FIG. 1, a flowchart 100 depicting an embodiment consistent with the above-described process is shown starting at 102. At 104, if content is requested, the IPTV device checks to see if the content is stored locally at 108. If not, the content is streamed over the Internet at whatever quality the bandwidth of the Internet connection can accommodate at 112. This content is displayed at 116 until the content is completed at 120, at which point control returns to 104. However, in accordance with preferred operation, a portion of the content will be stored locally at 108, and this content is streamed at 124 from the local storage. A stream of augmentation data from the content provider is also streamed at 128. (It will be understood that operations 124 and 128 are carried out substantially in parallel, despite the sequential depiction in the drawing.) At 130, the local stored data and the augmentation data are combined to produce a higher quality set of content than that which would normally be available from either the stored content alone or the content streamed from the service provider.

In accordance with certain embodiments, the augmentation data may be made up of high frequency components of compressed video content (e.g., using wavelet technology). In other embodiments, sub-sampling may be utilized to provide the lower quality stored version of the content that is stored locally. In certain embodiments, the sub-sampled content is either spatially frame or time sub-sampled. For example, in certain embodiments, certain frames are dropped to conserve bandwidth or 1, 2 or 3 pixels out of every 4 pixels may be sampled and pre-fetched. Many embodiments can be contemplated by those skilled in the art upon consideration of the present teachings, including combination of the above sub-sampling techniques, along with using high frequency components as augmentation data. In the case where sub-sampling is used, the portions of the content that are missed by virtue of sub-sampling are used as the augmentation data.

Referring back now to process 100 of FIG. 1, the process shown in broken lines is indicative of an ongoing parallel process that occurs whenever a content request is not being fulfilled by streaming content from the service provider over the internet. When such a request is not being fulfilled, a purge algorithm 140 may be running to prevent local storage from being unnecessarily occupied by content that is less likely to be needed. Also, in accordance with embodiments consistent with the present invention, content that is stored locally is stored or purged in the basis of a score that exceeds or drops below a specified threshold (or multiple thresholds), as will be discussed later. At 144, if the service provider has content with a score that is greater than this threshold and storage is available, the lower quality content is streamed from the service provider and stored locally at 148. This background process will be discussed in greater detail later, but is to be understood that it may be operating in a somewhat continuous background mode as the dynamics of content scoring induce changes in scores.

Figure 2:
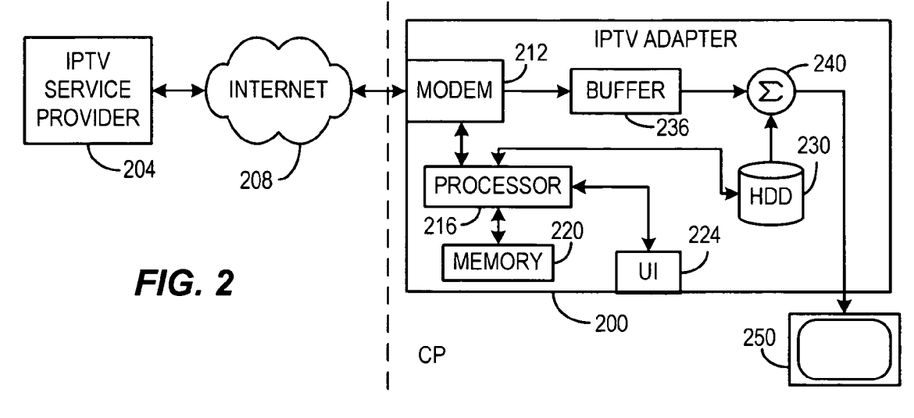
FIG. 2 is a block diagram of an IPTV system consistent with certain embodiments of the present invention.

Referring now to FIG. 2, an Internet protocol television adapter 200 is depicted connected in a system wherein content can be delivered over the Internet. In this figure, an IPTV (Internet Protocol Television) service provider 204 provides content over the Internet 208 to the customer's premise and in turn to the IPTV adapter 200. The IPTV adapter 200 may incorporate a modem 212 that communicates with the service provider 204 via the Internet 208. The modem operates under the control of processor 216 which further interfaces with working memory 220 and any suitable user interface 224.

User interface 224 permits the user to provide various input as to the programming that the viewer chooses to consume via the IPTV adapter 200. Moreover, the user interface 224 provides the user with the ability to specify preferences and provide other information to the IPTV adapter 200 or the IPTV service provider 204.

Processor 216 is also interfaced to a hard disc drive 230 or other mass storage medium for storage of portions of content that are downloaded from the IPTV service provider 204 in anticipation of consumption by the viewer. In accordance with certain embodiments consistent with the present invention, when the viewer is consuming content via the IPTV adapter, a portion of the content is streamed from hard disc drive or other mass storage 230 while another portion is streamed through the Internet 208 via modem 212. This latter portion of the content is buffered at a buffer 236 and is combined in appropriate synchronization with the content being streamed from the mass storage device 230 at a combiner circuit 240 (i.e., a multiplexer) to produce higher definition or higher quality audio and/or video than that which would normally be available by purely streaming the content over the internet 208. Once this content is combined, it is displayed or otherwise played back on a display device 250 or similar reproduction device. Not shown in this illustration for simplicity of explanation, is that the digital content may be converted to another format suitable for display on display device 250 and for playback over audio circuitry (not shown).

Figure 3:
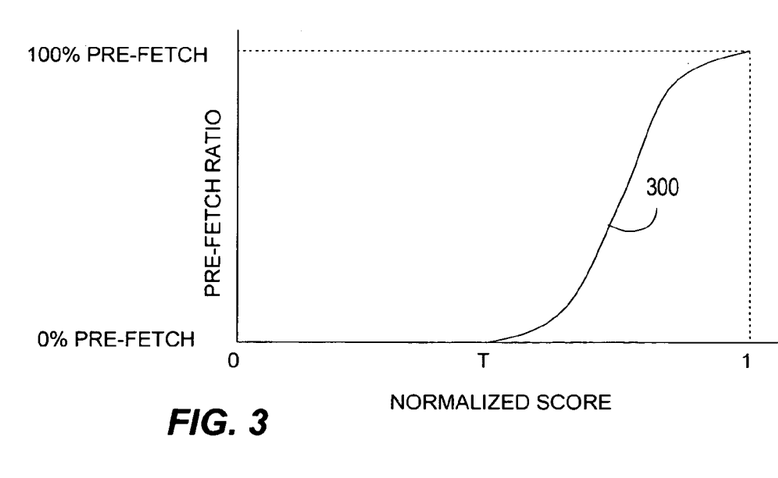
FIG. 3 is a graph depicting a curve describing one embodiment of a prioritizing scheme for prefetching content in a manner consistent with certain embodiments of the present invention.

Since one or more IPTV service providers such as 204 may be utilized for downloading and viewing content over the internet, it is impractical to provide local storage that can accommodate all the available programming. Accordingly, a mechanism is utilized in a manner consistent with embodiments of the present invention to advantageously select that content which should be pre-stored or pre-fetched from the IPTV service providers such as 204. With reference to FIG. 3, an example curve is provided which indicates that if all content is accorded a score on an item-by-item basis, that is if each item of content is given a score, and that score is normalized to one (or 100%), one can plot a curve similar to 300, which depicts both a likelihood of consumption of content by the viewer, as well as a portion of the content that the IPTV adapter may advantageously store locally in mass storage 230. The actual curvature of curve 300 is depicted in abstract, and can be adjusted to fit real life experience in most advantageous selection of content and amounts of content to store.

In accordance with this curve, up until a threshold score T is achieved for an item of content, no pre-fetching of that content occurs. However, as the score representing the likelihood of a viewer consuming the content increases above the threshold value T, it becomes advantageous to begin storage of a portion of the content locally in accordance with the likelihood that the user will consume the content. Thus, shortly after a score exceeds the threshold, some amount of the content might advantageously be pre-fetched. As the normalized score approaches one, indicating that the user has a 100% probability of consuming the content, the quantity of content that is to be pre-fetched can increase to 100% (either of the lower quality or the higher quality content). In this manner, content which is most likely to be desired by the viewer is most readily available for consumption at a high quality standard, and is available in the greatest quantity. If the local storage 230 contains a complete copy of the low quality content, the viewer is at least guaranteed of being able to see an uninterrupted viewing of the content. As the bandwidth available via the Internet permits, this content can be supplemented by high frequency components and/or other enhancements to permit viewing of content in a higher quality mode. Thus, although the quality may fluctuate, the ability of the viewer to consume the content does not.

Figure 4:
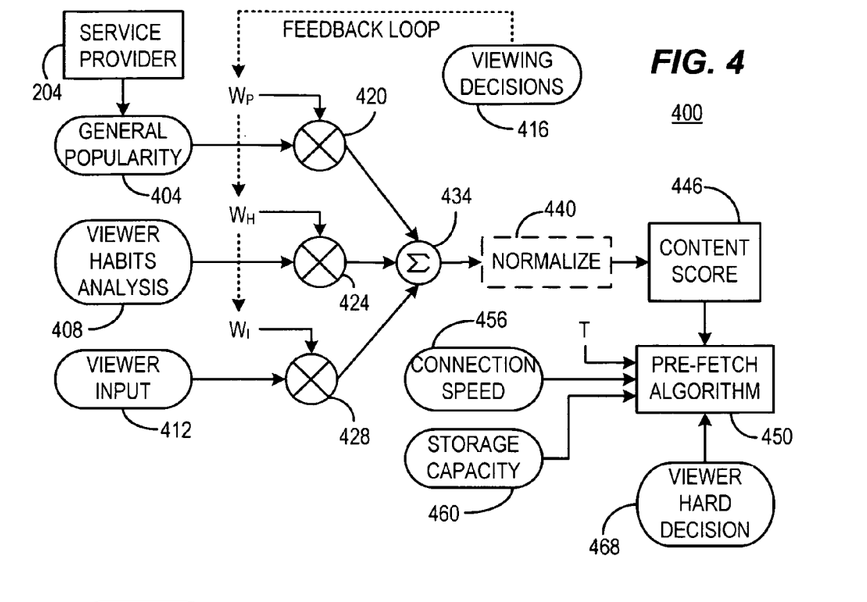
FIG. 4 is diagram depicting a prioritizing process for scoring content consistent with certain embodiments of the present invention.

Referring now to FIG. 4, one algorithm is depicted for attaching a score to a particular item of content. Data can be provided from a number of sources and in a number of ways to formulate a figure of merit or score used to determine which content is pre-fetched and which content is not, and to what degree such content is pre-fetched. In algorithm 400, the service provider 204 can supply information as to the general popularity of a given item of content among multiple users (e.g., based upon viewership experiences, ratings, etc.). In addition, a user profile reflecting an analysis of viewer habits (that can be either static or dynamic reflecting the viewer's habits and likes and dislikes) at 408 can enter into the computation. Additionally, direct viewer input can be supplied at 412, such as for example a high preference for a particular genre of content or a particular film or program series. Each of these inputs can be considered a component score that factors into the present algorithm 400.

In accordance with embodiments consistent with the present invention, these component scores are modified in a feedback loop based upon actual viewing decisions 416 made by the viewer and weighting functions. This loop functions in much the same way as the adjustment of weighting factors in a neural network or equalizer circuit. The weighting function for general popularity is shown as $W_P$, while the weighting function for viewer habits is shown as $W_H$. The weighting function for viewer input is shown as $W_I$. These weighting functions can be adjusted much like those of an equalizer circuit or a neural network using a feedback loop based upon the actual viewing decisions 416 as depicted in broken lines in process 400. Weight function $W_P$ multiplies the general popularity score at 420, while weighting function $W_H$ multiplies the viewer habit analysis score at 424, and $W_I$ multiplies the viewer input score component at 428. Each of these weighted scores is then added together at 434 in order to produce a weighted score from the various input components as an output. Those skilled in the art will appreciate upon considering the present teachings that other factors may also be used as weighted or unweighted scoring components in a similar algorithm.

In accordance with preferred embodiments, this weighted score output at 434 is preferably normalized at 440 to have a maximum value of one (or 100% or any other convenient number). However, those skilled in the art will appreciate that normalization is optional and need not be considered a requirement. Once normalized at 440, the content is accorded a score at 446, and this score may dynamically change with the viewer's habits, viewer input, or general popularity variations or with feedback based upon the viewing decisions made by the viewer at 416. This score is then utilized in a pre-fetch algorithm at 450, which compares the score with a threshold T as shown and also figures in the storage capacity 460 and the connection speed 456 of the internet connection to determine which content is actually pre-fetched and stored in mass storage device 230. In addition, a viewer may make a hard decision 468, which explicitly specifies that a particular element of content is desirable to be pre-fetched. In such case, this can be interpreted as a score of 1.0 and therefore rides to a high priority in the download or pre-fetch process and translates into download of the largest percentage of the content.

One skilled in the art will appreciate upon consideration of the present teaching that other weighted scoring factors may be incorporated into the algorithm to enhance the accuracy of the prediction without departing from embodiments consistent with the present invention.

Figure 5:
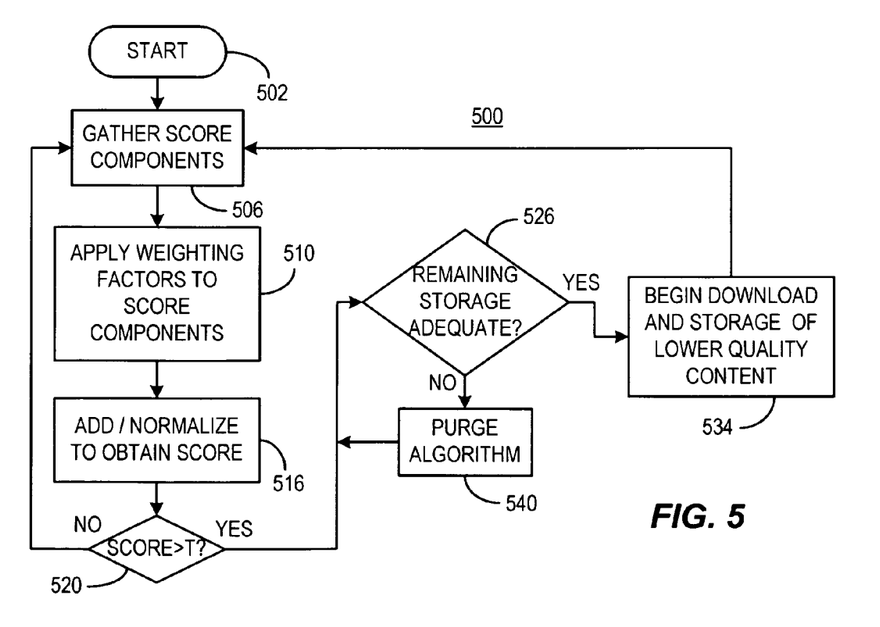
FIG. 5 is a flow chart depicting a content downloading process consistent with certain embodiments of the present invention.

FIG. 5 provides an overview in the form of process 500 shown in flowchart form starting at 502. At 506, the various score components are gathered, and the score components are weighted at 510. The weighted score components are then added together and normalized to obtain the final normalized score at 516. If the score is not greater than a threshold T, then control of the process returns to 506. However, if the threshold is exceeded at 520, and there remains adequate storage at 526, then the download and storage of the lower quality content is begun and carried out at 534. In the event the storage is inadequate at 526, the purge algorithm may be invoked at 540 to purge lower scoring content, or content dropping below a threshold, from the local storage medium.

It is clear that in the absence of an appropriate purging algorithm, content will continue to accumulate in the local storage device 230 until all available storage is consumed. Hence, it is advisable to provide a purging algorithm that, in addition to manual purging, can maintain the availability of storage space in the local storage device 230 for use in a manner consistent with embodiments of the present inventions.

Figure 6:
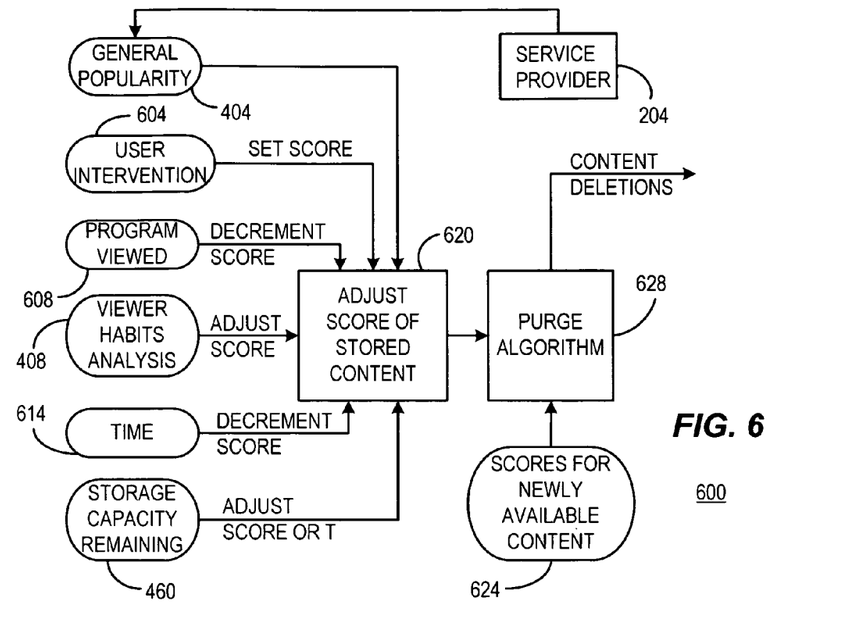
FIG. 6 is a flow chart depicting a mechanism for adjustment of a score for a stored item of content consistent with certain embodiments of the present invention.

Process 600 as shown in FIG. 6 depicts one such purging algorithm, which operates in a manner somewhat similar to the scoring algorithm previously described. In this algorithm, various scoring factors are again accumulated to produce a score that can be used as a figure of merit in determining what content should be kept and what content should be purged.

Although not shown, it will be appreciated that a weighting system and a feedback mechanism can be provided to refine the various weighting factors for the score produced in accordance with the present embodiment.

In this example, the service provider 204 continues to provide general popularity information 404 for purposes of updating the scoring. By way of example, certain newly recent content may be more popular and thus have a higher score than older content. Similarly, content that is deemed to be classic or extremely high quality may maintain a relatively high general popularity score for long periods of time. Older and lesser quality content may have a lower score. User intervention can be used at 604 to manually purge or set a score by way of a prioritization system or other convenient mechanism. At 608, once a program is viewed, it is likely that the score could be decremented down to and including reduction to zero so that the viewed program can be fully purged (immediately or after a prescribed time interval) once it is viewed. In other embodiments, a user may be given an option as to whether or not a particular viewed program's score should be decremented after viewing.

The score may also be adjusted by virtue of variation in the viewer's viewing habits and an analysis thereof at 408. As a viewer's taste changes or viewing habits change or changes are made to a profile, the score may be adjusted accordingly. Additionally, as content remains in the local storage, it may become stale by virtue of the passage of time at 614. Thus, if an element of content has remained in storage locally for a long period of time, it is less likely that it will ever be viewed, and the score may be decremented at 614. Additionally, as the storage capacity of the local storage decreases or increases, the score or the threshold may be adjusted accordingly so as to maximize the likelihood that content stored in a limited storage capacity device is that which is most likely to be consumed. With all these factors and possibly others taken into consideration at 620, the score of the stored content can be adjusted and the content subjected to a purge algorithm at 628.

In one embodiment, as newly available content at 624 has a score that exceeds that of content that is already stored, the purge algorithm 628 will delete the content having the lower score. In other embodiments, the purge algorithm 628 may compare stored content with another threshold (for example, a higher threshold). Since the content is already stored, there may be a likelihood that it is more likely to be viewed than content of newly available content since it is more likely to be viewable at a higher level of quality. Or, content that has been stored for a long time may be less likely to be consumed. Projected availability of high levels of quality may also be depicted to the user via the user interface in order to allow the user the ability to intelligently select whether to accept a lower quality viewing experience or select programming that is capable of higher definition of higher quality viewing experience. Thus, the user may be presented with a menu of items stored so that the choice of viewing quality can factor into the user's selection criterion for entertainment.

Figure 7:
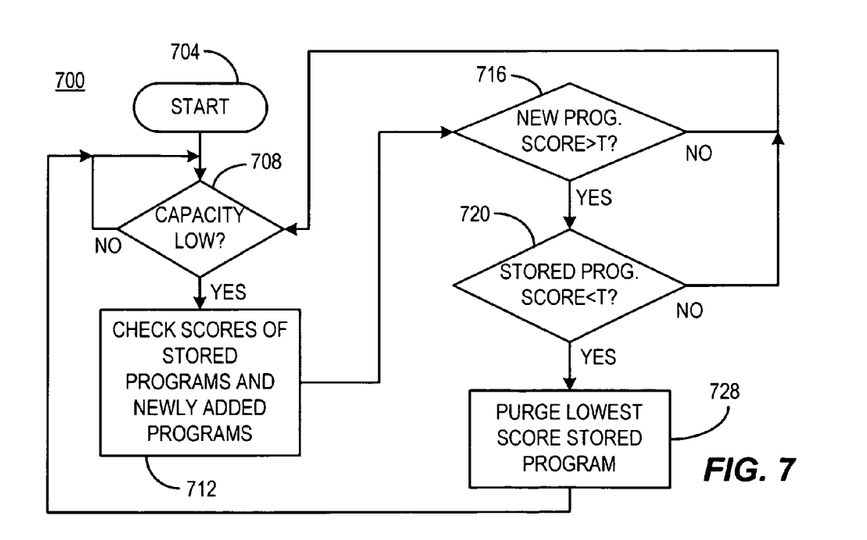
FIG. 7 is a flow chart depicting a purging process consistent with certain embodiments of the present invention.

Process 700 of FIG. 7 depicts the general process for purging as described above starting at 704. When capacity is not low at 708, there may be no reason to purge at all. However, when capacity is at a relatively low point (which may only indicate that a relatively small amount of the capacity has been consumed), the scores of stored programs and newly added programs are checked at 712. If no new programming has a score greater than the threshold at 716, control passes back to 708. However, if a new program has a score greater than T at 716 and a stored program has a score less than T at 720 (or less than a second threshold at 720), then the lowest score content is purged at 728, and control returns to 708. In this manner, capacity is maintained in availability at local storage 230 for consumption by the user.

Many variations will occur to those skilled in the art upon consideration of the present teachings. In the examples depicted, a low quality version of content is pre-fetched and augmentation content such as high frequency components are added later. However, one skilled in the art will appreciate upon consideration of the present teachings that the process could also be implemented by pre-fetching the augmentation content and then streaming the basic lower quality content without departing from embodiments consistent with the present invention, even though this embodiment is less preferred since it is less likely to provide continuity in the viewing process itself. In the preferred arrangement, when higher frequency components are streamed with wavelet coding or the like, there may be times when those components do not arrive in time for use, in which case, the frame can still be displayed without the higher frequency components, thereby preserving continuity (if not quality) of the viewing experience.

Thus, in accordance with certain embodiments, a method of providing improved quality of Internet Protocol (IP) video content over the Internet involves for an item of content, calculating a score representative of a likelihood that a particular viewer will order the item of content; if the score is greater than a threshold score T, then downloading a portion of the item of content from a content provider, and storing the portion of the item of content in a storage location local to the viewer; if the viewer elects to view the item of video content, then: retrieving the stored portion of the item of video content, streaming an augmentation to the stored portion of the item of video content from the content provider, and combining the stored portion with the augmentation of the stored portion to produce an improved resolution version of the item of video content.

In certain embodiments, a percentage of the improved resolution version of the item of video content that is stored is dependent upon the score value in that a higher percentage of the video content is stored when the video content has a higher score value. In certain embodiments, one of the stored portions and the augmentation of the stored portion comprise high frequency components of the video content. In certain embodiments, one of the stored portions and the augmentation of the stored portion comprise one of spatial sub-sampling, frame sub-sampling and time sub-sampling. In certain embodiments, the score is comprised of a summation of score components. In certain embodiments, at least one of the score components comprises a score component representing a general popularity of the item of content, a score component representing an analysis of the viewer's viewing habits as they relate to the item of content, and a score component representing a viewer's direct input regarding the item of content. In certain embodiments, the score components are weighted by a plurality of weighting factors. In certain embodiments, the weighting factors are dynamically altered by feedback. In certain embodiments, once the stored portion of the item of content is stored, the score of the item of content is modified the score is modified based upon a plurality of score components.

In certain embodiments, the plurality of score components comprise at least one of: a score component representing a general popularity of the item of content, a score component representing an analysis of the viewer's viewing habits as they relate to the item of content, a score component representing a viewer's direct input regarding the item of content, a component of passage of time, a score component representing remaining storage capacity, a score component representing viewing of the content, and a score component representing direct viewer intervention. In certain embodiments, the stored portion is purged when its score drops below a specified threshold. In certain embodiments, a computer readable storage medium stores instructions which, when executed on a programmed processor, carry out any of the methods disclosed.

In certain embodiments, an Internet Protocol video adapter has a modem that receives data including video content over the Internet. A storage device local to a viewer. A programmed processor carries out a process of: for an item of content, calculating a score representative of a likelihood that a particular viewer will order the item of content; if the score is greater than a threshold score T, then downloading a portion of the item of content from a content provider via the modem, and storing the portion of the item of content in the storage device local to the viewer; if the viewer elects to view the item of video content, then retrieving the stored portion of the item of video content, streaming an augmentation to the stored portion of the item of video content from the content provider, and combining the stored portion with the augmentation of the stored portion to produce an improved resolution version of the item of video content. Many variations will occur to those skilled in the art upon consideration of the foregoing.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping/concealment can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of providing improved quality of Internet Protocol (IP) video content over the Internet, comprising:
   for an item of IP video content, calculating a score representative of a likelihood that a particular viewer will order the item of video content;
   where the score comprises a weighted combination of score components, and where the score components comprise at least a score component representing a general popularity of the item of content among multiple users, a score component representing an analysis of the viewer's viewing habits as they relate to the item of content, and a score component representing a viewer's direct input regarding the item of video content;
   if the score is greater than a threshold score T, then downloading a portion of the item of video content from a content provider, and storing the portion of the item of video content in a storage location local to the viewer, where the downloaded portion of the item of video content comprises less than full video resolution of the video content;
   and where if the score is greater than the threshold T, a percentage of the item of video content that is downloaded and stored increases with increasing score;
   if the viewer elects to view item of video content, then:
   retrieving the stored portion of the item of video content, streaming an augmentation to the stored portion of the item of video content from the content provider, and combining the stored portion with the augmentation of the stored portion to produce an improved resolution version of the item of video content.

2. The method according to claim 1, where the percentage of the improved resolution version of the item of video content that is stored is dependent upon the score value in that a higher percentage of the video content is stored when the video content has a higher score value.

3. The method according to claim 1, wherein one of the stored portions and the augmentation of the stored portion comprise high frequency components of the video content.

4. The method according to claim 1, wherein one of the stored portions and the augmentation of the stored portion comprise one of spatial sub-sampling, frame sub-sampling and time sub-sampling.

5. The method according to claim 1, wherein the score is comprised of a summation of score components.

6. The method according to claim 1, wherein once the stored portion of the item of content is stored, the score of the item of video content is modified.

7. A tangible non-transitory computer readable storage medium storing instructions which, when executed on a programmed processor, carry the method according to claim 1.

8. The method according to claim 5, wherein the score components are weighted by a plurality of weighting factors.

9. The method according to claim 8, wherein the weighting factors are dynamically altered by feedback of actual viewer decisions to view items of stored video content.

10. The method according to claim 6, wherein the score is modified based upon a plurality of score components.

11. The method according to claim 10, wherein the plurality of score components used to produce the modified score additionally comprise at least one of: a component of passage of time, a score component representing remaining storage capacity, a score component representing viewing of the content, and a score component representing direct viewer intervention.

12. The method according to claim 10, wherein the stored portion is purged when its score drops below a specified threshold.

13. A method of providing improved quality of Internet Protocol (IP) video content over the Internet, comprising:
- for an item of IP video content, calculating a score representative of a likelihood that a particular viewer will order the item of content, wherein the score is comprised of a summation of score components weighted by weighting factors;
- where the score comprises a weighted sum of score components, and where the score components comprise at least a score component representing a general popularity of the item of content among multiple users, a score component representing an analysis of the viewer's viewing habits as they relate to the item of content, and a score component representing a viewer's direct input regarding the item of content;
- if the score is greater than a threshold score T, then downloading a portion of the item of content from a content provider, and storing the portion of the item of content in a storage location local to the viewer, where the downloaded portion of the item of content comprises less than full video resolution of the content;
- if the viewer elects to view the item of video content, then:
  - retrieving the stored portion of the item of video content,
  - streaming an augmentation to the stored portion of the item of video content from the content provider, and
  - combining the stored portion with the augmentation of the stored portion to produce an improved resolution version of the item of video content; and
- wherein a percentage of the improved resolution version of the item of video content that is stored is dependent upon the score value in that a higher percentage of the video content is stored when the video content has a higher score value.

14. The method according to claim 13, wherein one of the stored portions and the augmentation of the stored portion comprise high frequency components of the video content.

15. The method according to claim 13, wherein one of the stored portions and the augmentation of the stored portion comprise one of spatial sub-sampling, frame sub-sampling and time sub-sampling.

16. The method according to claim 13, wherein the weighting factors are dynamically altered by feedback of actual viewer decisions to view items of stored video content.

17. The method according to claim 13, wherein once the stored portion of the item of video content is stored, the score of the item of video content is modified based upon a plurality of score components.

18. The method according to claim 17, wherein the plurality of score components used to produce the modified score additionally comprise at least one of: a component of passage of time, a score component representing remaining storage capacity, a score component representing viewing of the content, and a score component representing direct viewer intervention.

19. The method according to claim 17, wherein the stored portion is purged when its score drops below a specified threshold.

20. An Internet Protocol video adapter, comprising:
- a modem that receives data including IP video content over the Internet;
- a storage device local to a viewer;
- a programmed processor that carries out a process of:
  - for an item of video content, calculating a score representative of a likelihood that a particular viewer will order the item of video content;
  - where the score comprises a weighted combination of score components, and where the score components comprise at least a score component representing a general popularity of the item of video content among multiple users, a score component representing an analysis of the viewer's viewing habits as they relate to the item of video content, and a score component representing a viewer's direct input regarding the item of video content;
  - if the score is greater than a threshold score T, then downloading a portion of the item of video content from a content provider via the modem, and storing the portion of the item of video content in the storage device local to the viewer, where the downloaded portion of the item of content comprises less than full video resolution of the video content;
  - where if the score is greater than the threshold T, a percentage of the item of video content that is downloaded and stored increases with increasing score; and
  - if the viewer elects to view the item of video content, then retrieving the stored portion of the item of video content, streaming an augmentation to the stored portion of the item of video content from the content provider, and combining the stored portion with the augmentation of the stored portion to produce an improved resolution version of the item of video content.

21. The Internet Protocol video adapter according to claim 20, wherein a percentage of the improved resolution version of the item of video content that is stored is dependent upon the score value in that a higher percentage of the video content is stored when the video content has a higher score value.

22. The Internet Protocol video adapter according to claim 20, wherein one of the stored portions and the augmentation of the stored portion comprise high frequency components of the video content.

23. The Internet Protocol video adapter according to claim 20, wherein one of the stored portions and the augmentation of the stored portion comprise one of spatial sub-sampling, frame sub-sampling and time sub-sampling.

24. The Internet Protocol video adapter according to claim 20, wherein the score is comprised of a summation of score components.

25. The Internet Protocol video adapter according to claim 20, wherein once the stored portion of the item of content is stored, the score of the item of content is modified.

26. The Internet Protocol video adapter according to claim 24, wherein the score components are weighted by a plurality of weighting factors.

27. The Internet Protocol video adapter according to claim 26, wherein the weighting factors are dynamically altered by feedback of actual viewer decisions to view items of stored video content.

28. The Internet Protocol video adapter according to claim 25, wherein the score is modified based upon a plurality of score components.

29. The Internet Protocol video adapter according to claim 28, wherein the plurality of score components used to produce the modified score additionally comprise at least one of: a component of passage of time, a score component representing remaining storage capacity, a score component representing viewing of the content, and a score component representing direct viewer intervention.

30. The Internet Protocol video adapter according to claim 28, wherein the stored portion is purged when its score drops below a specified threshold.

31. A method of providing improved quality of Internet Protocol (IP) video content over the Internet, comprising:

for an item of IP video content, calculating a score value representative of a likelihood that a particular viewer will order the item of video content;
where the score comprises a weighted sum of score components, and where the score components comprise at least a score component representing a general popularity of the item of content among multiple viewers, a score component representing an analysis of the viewer's viewing habits as they relate to the item of content, and a score component representing a viewer's direct input regarding the item of video content;
if the score is greater than a threshold score T, then downloading a portion of the item of video content from a content provider, and storing the portion of the item of video content in a storage location local to the viewer, where the downloaded portion of the item of content comprises less than full video resolution of the content, and wherein:
   a variable percentage of the portion of the item of video content that is stored is dependent upon the calculated score value in that a higher percentage of video content is stored when the video content has a higher score value;
   one of the stored portions and an augmentation to the stored portion comprise one of spatial sub-sampling, frame sub-sampling and time sub-sampling; and
   the calculated score value is comprised of a summation of score components weighted by a plurality of weighting factors that are dynamically altered by feedback of actual viewer decisions to view items of stored video content; and
if the viewer elects to view the item of video content, then: retrieving the stored portion of the item of video content, streaming the augmentation to the stored portion of the item of video content from the content provider, and combining the stored portion with the augmentation of the stored portion to produce an improved resolution version of the item of video content.

32. A tangible non-transitory computer readable storage medium storing instructions which, when executed on a programmed processor, carry the method according to claim 31.

33. A tangible non-transitory computer readable storage medium storing instructions which, when executed on a programmed processor, carry the method according to claim 13.

* * * * *